US009064242B2

(12) United States Patent
Lee et al.

(10) Patent No.: US 9,064,242 B2
(45) Date of Patent: Jun. 23, 2015

(54) METHOD AND APPARATUS FOR MANAGING SPAM MESSAGE IN MESSAGING SERVICE

(75) Inventors: Ji-Hye Lee, Gyeonggi-Do (KR);
 Dong-Young Lee, Gyeonggi-Do (KR);
 Sang-Min Lee, Gyeonggi-Do (KR);
 Seung-Jae Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 133 days.

(21) Appl. No.: 13/147,556

(22) PCT Filed: Feb. 2, 2010

(86) PCT No.: PCT/KR2010/000626
 § 371 (c)(1),
 (2), (4) Date: Aug. 2, 2011

(87) PCT Pub. No.: WO2010/090425
 PCT Pub. Date: Aug. 12, 2010

(65) Prior Publication Data
 US 2011/0289169 A1 Nov. 24, 2011

Related U.S. Application Data

(60) Provisional application No. 61/149,991, filed on Feb. 4, 2009, provisional application No. 61/158,410, filed on Mar. 9, 2009, provisional application No. 61/165,890, filed on Apr. 1, 2009.

(30) Foreign Application Priority Data

Jan. 27, 2010 (KR) .................. 10-2010-0007581

(51) Int. Cl.
 *G06F 15/16* (2006.01)
 *G06Q 10/10* (2012.01)

(52) U.S. Cl.
 CPC .................................. *G06Q 10/107* (2013.01)

(58) Field of Classification Search
 CPC ....... H04L 67/306; H04L 67/10; H04L 67/16; H04L 63/10
 USPC .......................................................... 709/206
 See application file for complete search history.

(56) References Cited

U.S. PATENT DOCUMENTS

| 7,552,862 | B2* | 6/2009 | Flake et al. ................... 235/375 |
| 8,095,547 | B2* | 1/2012 | Jeong et al. ................... 707/752 |
| 2006/0031325 | A1* | 2/2006 | Cheng ........................... 709/206 |
| 2006/0173985 | A1* | 8/2006 | Moore ........................... 709/223 |

(Continued)

FOREIGN PATENT DOCUMENTS

| KR | 10-2004-0092707 | 11/2004 |
| KR | 10-2009-0003041 | 1/2009 |

*Primary Examiner* — Kevin Bates
*Assistant Examiner* — S M Rahman
(74) *Attorney, Agent, or Firm* — Birch, Stewart, Kolasch & Birch, LLP (57) ABSTRACT

A method and apparatus for managing a spam message in a messaging service are disclosed. When a user reports a message determined as a spam message, he may directly select a sharing level of his personal information in order to prevent a leakage of the personal information according to a sharing policy, reports the spam message by transmitting only a hash value of the spam message in order to prevent an increase in traffic. With respect to reported spam messages, a user can access a spam server to check an erroneously reported message through a sorting algorithm.

6 Claims, 8 Drawing Sheets

(56) References Cited

U.S. PATENT DOCUMENTS

| | | | |
|---|---|---|---|
| 2007/0168436 A1* | 7/2007 | Andam | 709/206 |
| 2008/0134285 A1* | 6/2008 | Kim et al. | 726/1 |
| 2008/0155693 A1* | 6/2008 | Mikan et al. | 726/23 |
| 2008/0256602 A1* | 10/2008 | Pagan | 726/3 |
| 2009/0147936 A1* | 6/2009 | Won et al. | 379/201.02 |
| 2009/0217163 A1* | 8/2009 | Jaroker | 715/700 |
| 2009/0234876 A1* | 9/2009 | Schigel et al. | 707/102 |
| 2010/0174788 A1* | 7/2010 | Vitaldevara et al. | 709/206 |
| 2011/0119749 A1* | 5/2011 | Park et al. | 726/12 |

* cited by examiner

Fig. 9

METHOD AND APPARATUS FOR MANAGING SPAM MESSAGE IN MESSAGING SERVICE

This application is the National Phase of PCT/KR2010/000626 filed on Feb. 2, 2010, which claims priority under 35 U.S.C. 119(e) to U.S. Provisional Application No(s). 61/149,991 filed on Feb. 4, 2009, 61/158,410 filed on Mar. 9, 2009 and 61/165,890 filed on Apr. 1, 2009, and under U.S.C. 119(a) to patent application No. 10-2010-0007581 filed in the Republic of Korea on Jan. 27, 2010, all of which are hereby expressly incorporated by reference into the present application.

TECHNICAL FIELD

The present invention relates to an effective management of spam messages.

BACKGROUND ART

Spam messages are those unwanted but transmitted to a plurality of recipient regardless of the intention of the recipients. Because a huge amount of spam messages are transmitted, the recipients are unnecessarily supposed to check the messages, the storage capacitor of a terminal or a receiving device unnecessarily is wasted, and those spam messages may include harmful information or correspond to virus.

Thus, mobile communication providers (or mobile carriers) try to prevent messages considered to be spam from being transmitted to a terminal or a receiving device of a recipient generally by installing a spam server within a communication network. When a particular message received by a person is reported as a spam for the reason that it is a spam message or when a particular message which includes a particular word or is received from a particular address so as to be classified as a spam message according to a search algorithm of a spam server, the spam server stores the content of the corresponding message, the address from which the corresponding message has been transmitted, personal information or the like of the person which has reported, or the like, in a spam box, and then interrupts or blocks a message transmitted from the same address or interrupts or blocks a message of the same content. The spam server may be separately installed or may be positioned with a message transmission server.

Once the message is classified as a spam message as a result from reporting or the like, if the same message is requested to be transmitted, it is classified as a spam message by the spam server and not transmitted to the terminal or the receiving device of the recipient. Thus, when a transmission-requested message is a spam message, the spam server must interrupt transmission of the spam message in advance, for which the spam server must have information regarding the spam message.

A typical method of collecting spam message information is that when a communication network subscriber first receives a spam message, he may report the spam message to the spam server, so that when the same spam message is requested to be transmitted later, the spam server interrupts it. Namely, when the person receives a message suspected as a spam message, it may report the received message to the spam server or report an address value of a server from which the message suspected as the spam message has been transmitted to the spam server, and accordingly, a database with respect to the spam message can be established in the spam server.

In addition, the government, mobile carriers, or a third communication security provider, and so on, may formulate a shared policy with respect to spam message information, based on which spam messages can be collectively managed. Namely, a government agency managing spam information and a company managing a spam server may share spam information each has collected to effectively process the spam messages with respect to a spam message selecting method or a spam message determining method or the like. The shared policy refers to operation or enforcement of a mutual agreement and configuration regarding sharing of spam information based on a policy, and in general, an original spam message reported as a spam and personal information who has reported the spam message are shared.

In terms of hardware, the spam server manages the reported spam message based on the externally shared policy in relation with the information regarding the spam message, and shares it with the terminal which has reported the spam message.

However, the related art has the following problems. That is, due to the consistent shared policy, when the person reports a spam message upon receiving it, personal information of the person may be shared against his intention between a different mobile carrier or a third communication security provider, and when the shared policy is altered, information about the altered shared policy is not provided to the person whenever it is altered, so the person cannot be aware of it.

Also, when the person reports the spam message to the spam server, he should transmit all the spam message text to the spam server, causing a problem that network traffic increases. Even in case where only an address value of a message transmission server is transmitted to report the spam message, the spam server should bring all the message text in order to check whether or not the reported message is a spam message, also increasing the traffic.

In addition, if a message is reported so as to be classified as a spam message but actually it is not a spam message, it is not transmitted to the terminal or the receiving device, making it impossible for the recipient to check that the message is not a spam message nor to check the corresponding message in a different manner.

DISCLOSURE OF INVENTION

Solution to Problem

Accordingly, one object of the present invention is to address the above-noted and other problems.

Another object of the present invention is to provide an apparatus and method for managing a spam message, by which if a transmission-requested message is a sure spam message through a sorting algorithm, it is not transmitted to a terminal but kept in a spam box and the user is allowed to check the message, and if a message received by the terminal is reported as a spam message, the user (message recipient) can select a shared degree and extent of personal information according to personal information sharing policy to thus prevent a leakage of the personal information of the user against his intention, and a report procedure is simplified only with a hash value of the message to thereby reduce the amount of traffic between a spam server and the terminal.

To achieve these and other advantages and in accordance with the purpose of the present invention, as embodied and broadly described herein, the present invention provides in one aspect a method for managing a spam message by a spam server, including: determining whether or not a message requested to be transmitted by a transmission server corresponds to a spam-confirmed message by using a first sorting algorithm; when the message is not a spam-confirmed message, determining whether or not the message is suspected as a spam message by using a second sorting algorithm; and when the message is suspected as a spam message, adding an indication that the message corresponds to a spam-suspected message to the message and transmitting the same, and when the message is determined not to correspond to a spam message as a result of the using of the second sorting algorithm, determining that the message is a normal message and transmitting the message.

To achieve the above objects, the present invention provides in another aspect a method for managing a spam message, including: determining whether or not a message requested to be transmitted by a transmission server corresponds to a spam-confirmed message by using a first sorting algorithm; if the message corresponds to a spam-confirmed message, storing, by a spam server, the message in a spam box without transmitting it to a terminal device; when there is a request for checking the spam box by a user of the terminal with respect to the stored message, transmitting, by a transmission server, a list of spam messages, to the terminal; if there is a request for releasing spam with respect to a message on the spam message list, attaching a spam flat to the message and transmitting the same to the user terminal; and permanently deleting the message stored in the spam box when a certain time lapses.

The terminal device may include: a receiver configure to receive a message from the transmission server; a first sorter configured to determine whether or not the message received from the transmission server is a spam-confirmed message; a storage medium configured to store the spam message when the message is filtered out by the first sorter; a second sorter configured to determine whether or not the message is suspected as a spam message if it is not filtered out by the first sorter; a controller configured to attach a spam flag to the message if the message is filtered out by the second sorter; and a transmitter configured to transmit the message which has completely undergone the sorting procedure to the transmission server.

The terminal device may include: a receiver configured to receive a sharing policy from a spam server; a storage medium configured to store the received sharing policy; a processor configured to alter the sharing policy according to a user selection when the user reports the received message as a spam message; and a transmitter configured to transmit the altered sharing policy to a spam server.

According to exemplary embodiments of the present invention, because the user can selected a sharing degree with respect to his personal information over a spam report sharing policy, the spam reporting can be effectively managed, and the problem that personal information is open against a user's invention can be resolved.

In addition, when the user reports a first spam message in a spam terminal or when the sharing policy of the spam server is altered, corresponding information is provided to the user, so that the user does not need to inquire about a setting whenever he reports a spam later. Thus, the user does not need to inquire about the setting whenever he reports a spam.

Also, when the user reports a spam message, he may need to transmit only a hash value of the spam message, thus reducing the amount of traffic between the spam terminal and the spam server.

Moreover, the user may access the spam server to check whether or not a message, which he was reported it as a spam message, has been erroneously reported or whether or not it is a non-received message. Also, because the number of reports of spam messages and spam messages reported according to the user request can be differentially sorted through the sorting algorithm, a spam-confirmed message and a spam-suspected message can be differentially discriminated.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings, which are given by illustration only, and thus are not limitative of the present invention, and wherein.

MODE FOR THE INVENTION

Hereinafter, exemplary embodiments of the present invention will be described in detail with reference to the accompanying drawings. The embodiments of the present invention, however, may be changed into several other forms, and the scope of the present invention should not be construed as being limited to the following embodiments. The embodiments of the present invention are intended to more comprehensively explain the present invention to those skilled in the art. Accordingly, the shapes of elements or the like shown in figures are exaggerated to emphasize distinct explanation, and elements indicated by like reference numerals in the figures mean like elements.

The invention may, however, be embodied in many different forms and should not be construed as being limited to the embodiments set forth herein. Rather, these emodiments are provided so that this disclosure will be thorough and complete, and will fully convey the scope of the invention to those skilled in the art. In describing the present invention, if a detailed explanation for a related known function or construction is considered to unnecessarily divert the gist of the present invention, such explanation will be omitted but would be understood by those skilled in the art.

Figure 1:
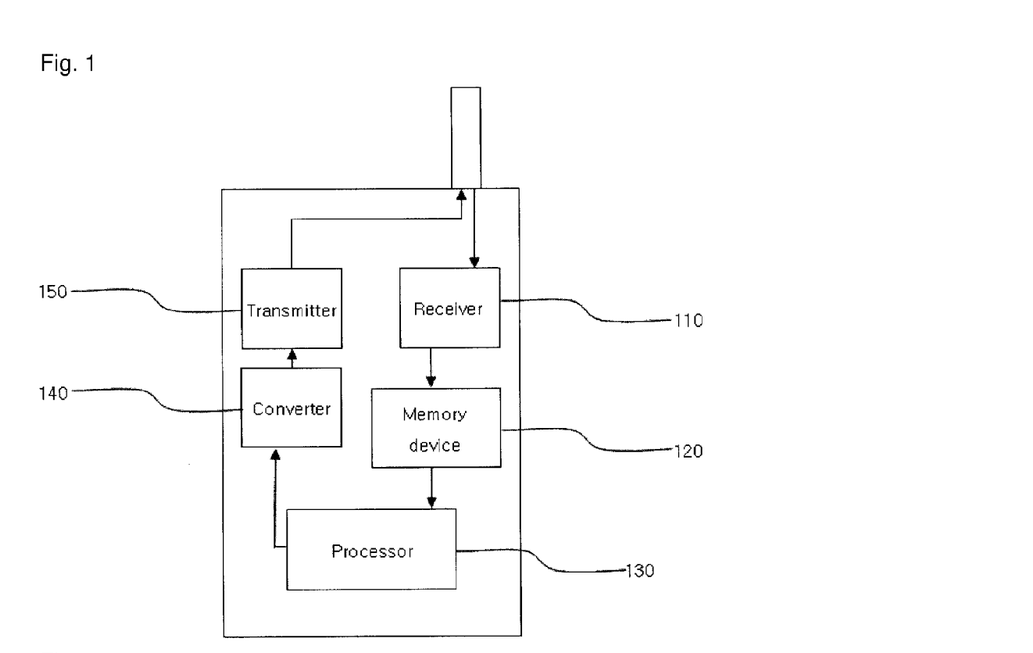
FIG. 1 is a schematic block diagram of a spam server according to an exemplary embodiment of the present invention.

FIG. 1 is a schematic block diagram of a spam server according to an exemplary embodiment of the present invention.

With reference to FIG. 1, a spam terminal 100 includes a receiver 110 for receiving a personal information sharing policy from a spam server, a storage medium 120 for storing the received personal information sharing policy, a processor for altering the sharing policy according to a user selection when a spam is reported, a converter 140 for performing a hash function to extract a hash value when the spam is reported, and a transmitter 150 for transmitting an altered sharing policy to the spam server.

Figure 2:
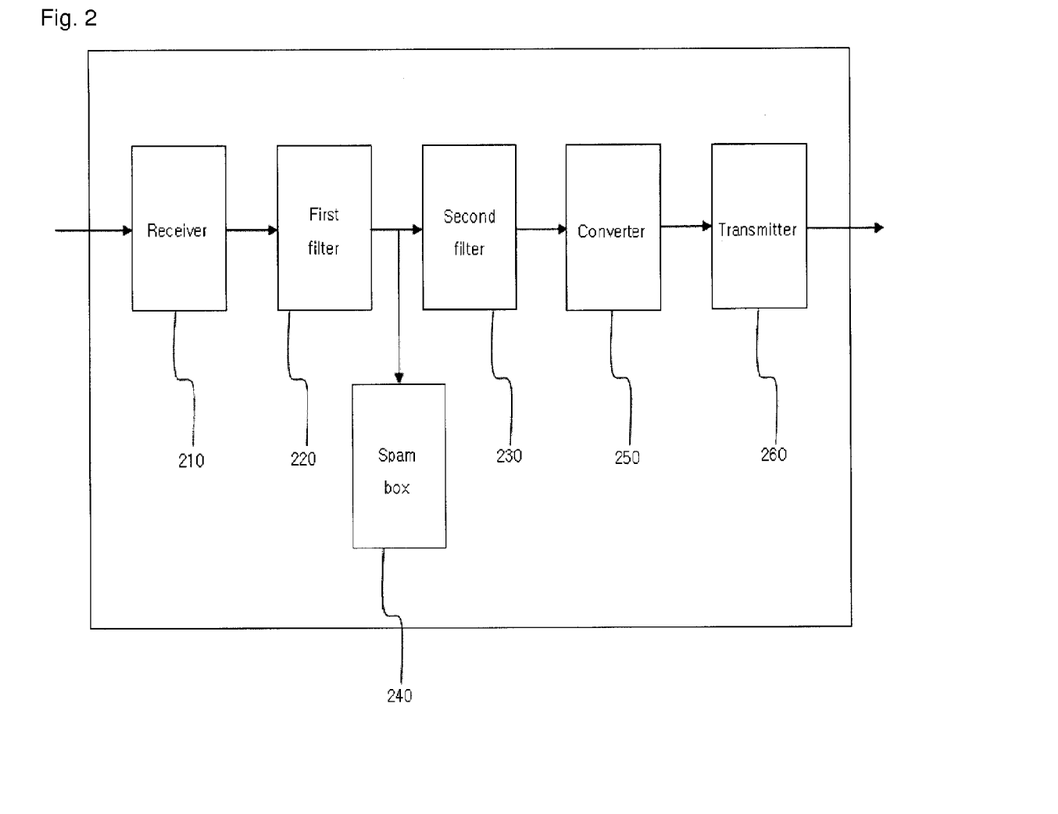
FIG. 2 is a schematic block diagram of a spam terminal according to an exemplary embodiment of the present invention.

FIG. 2 is a schematic block diagram of a spam terminal according to an exemplary embodiment of the present invention.

With reference to FIG. 2, the spam server 200 includes a receiver 210 for receiving a message from a transmission server, first and second sorters 220 for determining whether or not the message is a spam message, a spam box 240 for storing a message that is not transmitted to the terminal device as it is determined as a spam message, a controller 250 for attaching a spam flag to a spam-suspected message, a converter 260 for performing a hash function to obtain a hash value from original text of a message, and a transmitter 270 for transmitting a message, which has undergone the procedure of checking whether or not it is a spam message, to the transmission server.

Figure 3:
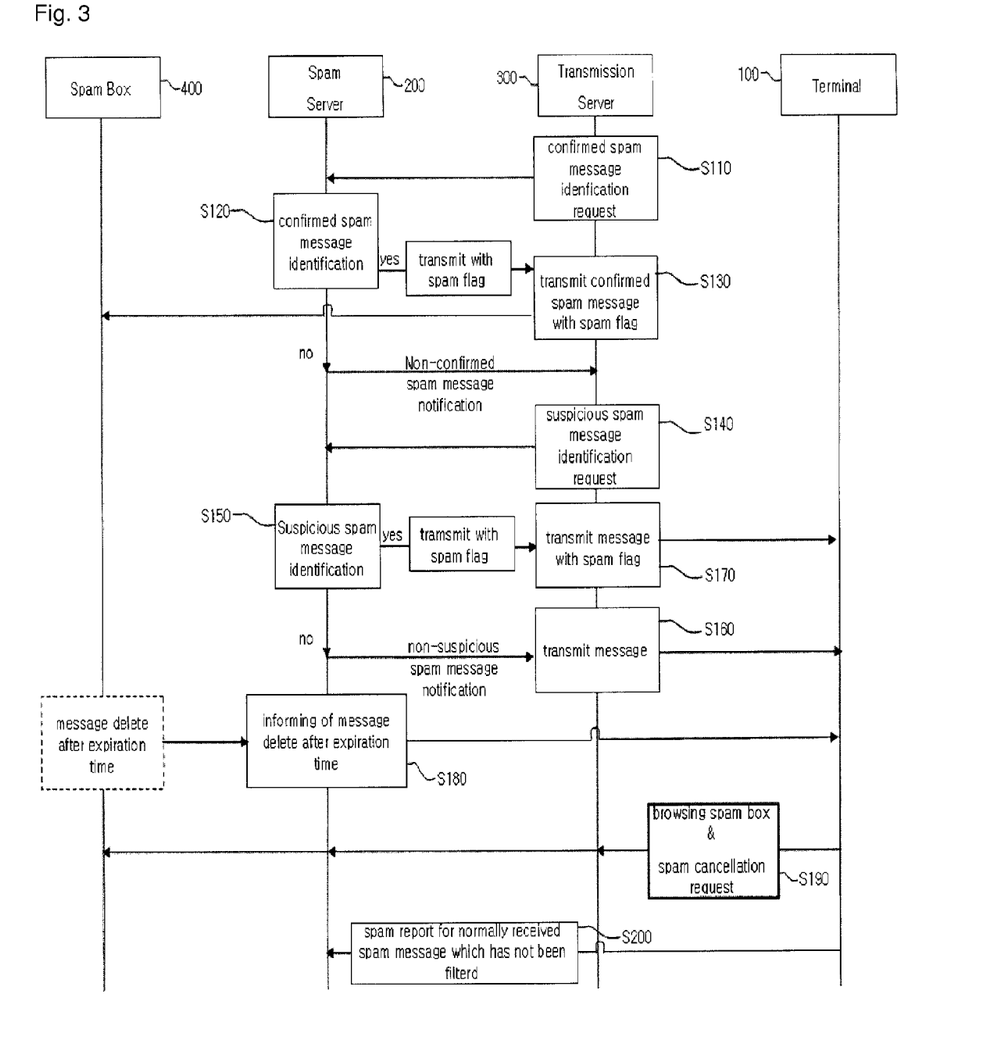
FIG. 3 is a flow chart illustrating the process of a method for sorting and processing a spam message transmitted to the spam server according to an exemplary embodiment of the present invention.

FIG. 3 is a flow chart illustrating the process of a method for sorting and processing a spam message transmitted to the spam server according to an exemplary embodiment of the present invention.

The spam server 200 may be positioned within the transmission server 300 or separately positioned from the transmission server 300. In the present exemplary embodiment, it is assumed that the spam server 20 and the transmission server 300 are separately positioned.

As shown in FIG. 3, before transmitting a message to a recipient, the transmission server 300 requests the spam server to check whether or not the message is a spam message (S110). When requesting, the transmission server 300 transmits information regarding a sender of the corresponding message, a sender ID, a recipient list, content, size, a transmission time, type, and the like, to the spam server 200.

In the case where the transmission server 300 transmits the message to the spam server 200 in order to check whether or not the message is a spam or not, in the present exemplary embodiment, the transmission server 300 transmits original text of the message, but the present invention is not limited thereto and, according to circumstances, one of the spam server 200 and the transmission server 300 performs a hash function to obtain a hash value of the message desired to be sent in order to use the hash value for checking whether or not the message is a spam, or the hash value and both the original text of the message may be sent together.

Accordingly, the spam server 200 can manage a black list, check virus, and manage a particular spam message.

In order to determine whether or not the reception-requested message is a spam message or a message containing a virus which must not be sent to the terminal, the spam server 200 performs filtering by using a sorter. Through filtering, the transmission-requested messages can be discriminated as i) a normal message, ii) sure spam message (referred to as a 'spam-confirmed message', hereinafter), and iii) a message suspected as a spam message (referred to as a 'spam-suspected message', hereinafter).

Whether or not the message is a spam-confirmed message is determined by the first sorter 220 (S120), and when the message is a spam-confirmed message, the spam server 200 informs the transmission server 300 that the corresponding message is a spam-confirmed message along with a spam flag. The transmission server 300 stores the corresponding message together with the spam flag received from the spam server 200 in the spam box 240 (S130). In this case, the reason classified as the spam-confirmed message may be attached through the spam flag as shown in Table 1 and stored together with the original text of the message in the spam box 240.

If the message is not a spam-confirmed message according to the filtering result of the first sorter 220, the spam server 200 informs the transmission server 200 that the corresponding message is not a spam-confirmed message. Upon receiving the information, the transmission server 300 requests the spam server 200 to check whether or not the corresponding message is a spam-suspected message (S140). The spam server 200 determines whether or not the corresponding message is a spam-suspected message through filtering by the second sorter 230 of the spam server 200 (S150). In the present exemplary embodiment, the message is determined to be classified a spam-confirmed message or a spam-suspected message through two-stage filtering, but the present invention is not limited thereto and, according to circumstances, a message can be determined to be classified by more than steps. In performing filtering, whether or not a message is a spam message can be determined through a spam message sorting algorithm using a spam flag as shown in Table 1

TABLE 1

| Spam flag | Description |
|---|---|
| 1 | When a message is registered as a spam message |
| 2 | When a phrase or content with history of having been reported as a spam is contained |
| 3 | When a phrase or content with history of having been reported to be prohibited for minor's reception |
| 4 | When a message is sent by a sender with history of having been reported for spam |
| 5 | When a message is set by a sender within a domain reported for spam |
| 6 | When message is likely to be a virus |
| 7 | When a file attached to a message is likely to contain a virus |
| 8 | When a sender sends a message to a large number of recipients at a time |
| 9 | When a message is likely to be a spam message based on an internal rule of a spam server |
| 10 | When a message is likely to be a virus based on the internal rule of the spam server |
| 11 | When a message is likely to be a spam message based on an externally known rule or organization |
| 12 | When a message is likely to be a virus based on an externally known rule or organization |

Besides the forgoing methods, when a message is desired to be transmitted, the transmission server may request the level of the message desired to be transmitted from the spam server. Then the spam server may set a level of the message to inform whether or not the corresponding message is a general normal message, a spam-confirmed message, or a spam-suspected message, and accordingly, the transmission server may store the corresponding message in the spam box or transmit it to the terminal.

A normal message is re-transmitted to the transmission server and then transmitted to the terminal device 100 via the transmission server (S160), while a spam-suspected message is transmitted to the terminal device, but after a flag indicating that it is a spam-suspected message is attached thereto and then transmitted to the terminal device 100 (S170). In this case, in transmitting the corresponding message, the transmission server 300 may also transmit a optional spam confirmation request flag together with the original text of the message.

If the optional spam configuration request flag is not contained, the terminal 100 may inquire about whether to transmit a spam report in checking the message.

When a message is classified as a spam-confirmed message, it is not transmitted to the terminal device, and when a certain time lapses, a message stored in the spam server is deleted. In this respect, however, according to an embodiment, the message may be set to be permanently stored unless it is intentionally deleted. When the message is permanently stored, spam messages are kept in the temporal order until when a storage capacity of the spam server is full unless the user checks and deletes it. When the storage capacity of the spam server is full, the spam messages are automatically deleted. When the storage capacity is full, no more spam messages can be stored, and in this case, corresponding information that the storage capacity of the spam server is full may be provided to the user through a spam flag or the like.

When it is set such that a spam message is automatically deleted with the lapse of a certain time, the spam server may inform the user that the spam message will be deleted within a certain period through a spam flag or the like, before the stored spam-confirmed message is deleted (S180). In this case, the user may access the spam server, before the spam message is deleted, to read the message labeled as the spam-confirmed message. If the user determines that the message is not a spam message, he may request to spam release (S190).

Conversely, when a normally received message is determined to be a spam message, the user may create a spam report and perform a spam report procedure (S200). The spam report may be sent in such a form as shown in Table 3, and personal reason of the user may be added to the report.

Figure 4:
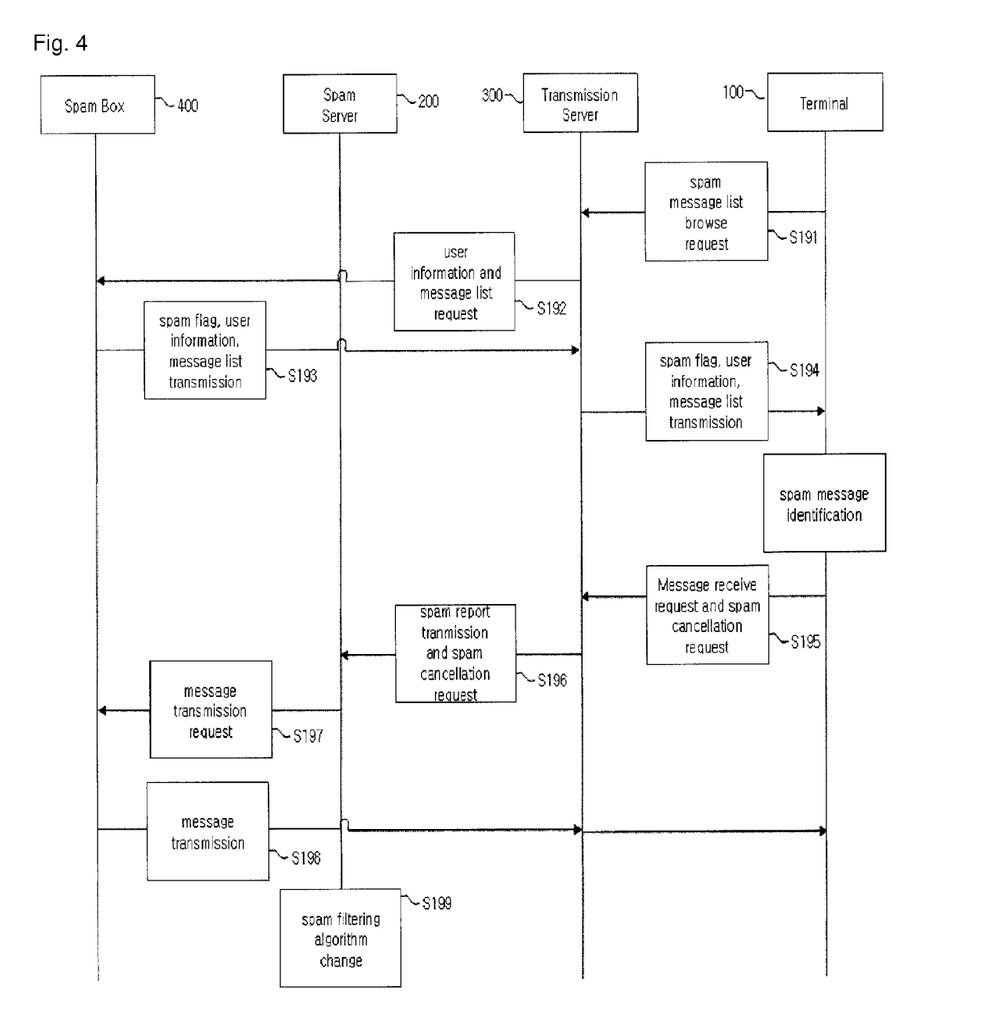
FIG. 4 is a flow chart illustrating the process of reading, by a user, a message stored in a spam box after being classified as a spam-confirmed message and requesting releasing of the spam message according to an exemplary embodiment of the present invention.

FIG. 4 is a flow chart illustrating the process of reading, by a user, a message stored in a spam box after being classified as a spam-confirmed message and requesting releasing of the spam message according to an exemplary embodiment of the present invention.

FIG. 4 shows sub-steps of step S190 indicated in a thick solid line in FIG. 3.

With reference to FIG. 4, the user requests the transmission server 300 to check a spam message stored in the spam box through the terminal 100 (S191).

The transmission server 300 requests user information and information regarding a message or a list of messages stored in the spam box 400 from the spam box 400 (S192).

In response to the request from the transmission server 300, the spam box 400 may transmit the check-requested message to the transmission server 300 or transmits user information of the check-requested message, a message ID, a message title, sender information, a transmission time, and spam flag information to the transmission server 300 (S193), and upon receiving of it, the transmission server 300 transmits the corresponding spam message list information to the user via the terminal 100 (S194).

Through the spam message list information transmitted to the terminal, the user can recognize whether or not the corresponding message is a spam message. Namely, through the spam flag, the user information, the message ID, the message title, the sender information, the transmission time, or the like, as shown in Table 1, attached to the spam message stored in the spam server, the user can recognize for what reason each spam message stored in the spam server has been labeled as the spam message and whether or not it is a definite spam message.

Upon checking, when the message stored in the spam box 400 is determined to be a general message, not a spam message, the corresponding message may be requested to be received from the transmission server 300 and, at the same time, a spam release request may be performed through a spam release request (S195). The spam release request may be transmitted together with an ID of the message (message ID) desired to be spam-released, a designation that the message is not a spam in its form, an optional personal opinion, and an optional spam flag. The spam release request may have a similar form to that of the spam report, and may select one or more release flags from among the report form as shown in Table 2.

If the user does not want to input an additional reason in creating the spam release request, the terminal may automatically send mutually symmetrical release flag values according to the content of the existing spam flag (Table 1) and send the same.

Namely, besides the server or an external stipulation, a recovery request with respect to a report for content transmitted by the user through the release request.

TABLE 2

| Release flag | Content |
|---|---|
| A | Message is not a spam report message (which corresponds to the spam flag 1 in Table 1) |
| B | Received content does not contain a spam phrase or content (which corresponds to the spam flag 2 in Table 1) |
| C | Received content does not include content which is to be shunned by the minor (which corresponds to the spam flag 3 in Table 1) |
| D | Message sender is not an interruption request subject (which corresponds to the spam flag 4 in Table 1) |
| E | Domain of message sender is not an interruption request subject (which corresponds to the spam flag 5 in Table 1) |
| F | Message does not correspond to virus (which corresponds to the spam flag 6 in Table 1) |
| G | File attached to message does not correspond to virus (which corresponds to the spam flag 7 in Table 1) |
| H | Other reasons (which can be personally added) (which corresponds to the spam flags 8 to 12 in Table 1) |

Upon receiving the spam release request, the transmission server 300 transmits a spam release report to the spam server 200 and requests spam release with respect to the corresponding message (S196), and the spam server 200 requests the corresponding message from the spam box 400 (S197). The spam box 400 transmits the corresponding message to the user terminal 100 via the spam server 200 and then via the transmission server 300, and in this case, the spam box 400 also transmits a spam flag along with the corresponding message (S198).

However, according to an embodiment, the message and the spam flag may be transmitted from the spam box 400 to the spam server 200 and then directly sent to the user terminal 100, or after the message and spam flag are transmitted from the spam box 400 to the transmission server 300 and then directly sent to the user terminal 100.

In this manner, when a spam release is requested for the message which was classified as the spam-confirmed message by the spam server 200, the level of the message may be adjusted by the spam server 200, the spam filter may be corrected or the internal management rule of the spam server 200 regarding a black list or a spam-subject content class may be corrected (S199).

In a different exemplary embodiment, when there is only a spam release request from the user terminal 100, without requesting transmission of the message with respect to spam, the transmission server 300 may transit a spam release request to the spam server 200 so that the level of the message may be adjusted by the spam server 200, the spam filter may be corrected, or only the internal management rule of the spam server 200 regarding a black list or a spam-subject content class may be corrected.

Likewise, when a received general message is determined to correspond to a spam message so the terminal 100 transmits a spam report to the transmission server 300, the transmission server 300 transmits a corresponding spam report to the spam server 200, so that a database with respect to the corresponding message can be established within the spam server 200, and the level of the message may be adjusted by the spam server 200, the spam filter may be corrected, or the internal management rule of the spam server 200 regarding a black list or a spam-subject content class may be corrected.

Also, when the corresponding message is recognized as a spam message but it is desired to be particularly received at a current time point, receiving of the corresponding message may be requested from the transmission server 300. In this case, however, when the spam message is received, a spam flag is also transmitted together, and the transmission server may include a warning message indicating that the corresponding message may have a virus in transmitting the message.

Also, when a message transferred to the user corresponds to a spam-suspected message, in case of a short message service (SMS), the spam server 200 or the transmission server 300 attaches a confirm flag in the form of IEIx+1 in a header of TP-UD to ask the user to confirm as to whether or not the transmitted message is a spam message.

Namely, when the user performs a spam report or release request by making a spam report request or a spam release request through a method of requesting for the user to confirm the corresponding message, the corresponding spam report or the release request is delivered to an SMSC in which it was stored or which has delivered as a portion of the message, and the spam server 200 may adjust the level of the message, correct the spam filter, or correct the internal management rule of the spam server 200 regarding a black list or a spam-subject content class.

In this case, however, when the spam server designates a spam-confirmed message based on a spam report from users, spam report may be made ill-intentionally or indiscriminately, causing a problem in that a message to be transmitted to the user is not delivered to the user. Thus, in order to prevent such problem, when a message is classified as a spam-confirmed message by the spam server, the user is informed for what reason it is classified as a spam message through the spam flag. Accordingly, the user can check the message before it is deleted by the spam server to have an opportunity of requesting a spam release. Also, when a message is classified as a spam-confirmed message and stored in the spam box, whether it has been classified according to a user report, whether or not it has been classified as a spam by an external reliable source, or whether or not it is based on the internal rule of the spam server, and the like, are also stored together, thus being cautious in making a spam release request.

The spam release request transmitted by the user is used as a reference in determining a spam grade of the corresponding message by the spam server in consideration of the fact that previously reported details were performed mendaciously or ill-intentionally. In this case, when a sender of a spam message or a user within a domain to which the corresponding user belongs mendaciously requests the spam release request, the spam server must filter it out, for which the spam server may compare the personal information stored in the spam message stored in the spam box.

Meanwhile, when a message is classified as a spam-suspected message, in order to warn that the message is likely to be a spam before the message is transmitted to the terminal device, a flag may be additionally added and transmitted. In case of the SMS, a predefined flag value is added to the IEIx of the header of the TP-UD (T P-user data) within an SMS-DELIVER message, and when a general multimedia messaging service (MMS), an e-mail, or the like, is transmitted by using an instant message service (IMS)-based session initial protocol (SIP), an additional flag is attached to the message and delivered. For example, in case of an e-mail, a header such as "X-Spam-Flag:<value>:<description>" may be added to the header part of the e-mail.

In an exemplary embodiment of the present invention, every message requested to be transmitted is subjected to the sorting algorithm. In this case, however, a message requested to be transmitted may be transmitted to the terminal device via the sorting algorithm from the spam server or may be directly transmitted to the terminal device from the transmission server.

Figure 5:
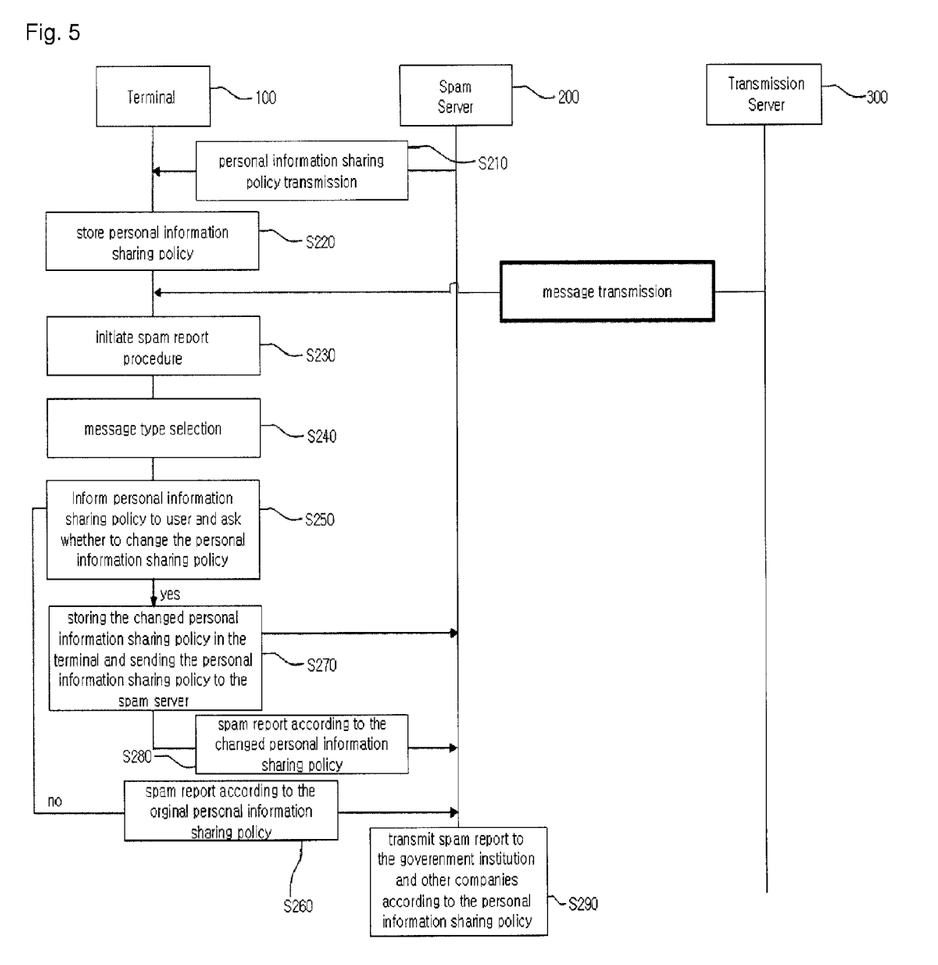
FIG. 5 is a flow chart illustrating the process of selecting a personal information sharing degree according to a personal information sharing policy when a message is reported as a spam message to the spam server.

FIG. 5 is a flow chart illustrating the process of selecting a personal information sharing degree according to a personal information sharing policy when a message is reported as a spam message to the spam server.

Although a message is determined to be a normal message according to a filtering result and thus transmitted to the terminal device, if the user determines that the received message corresponds to a spam message so he feels that a spam report is required, the user may perform a report procedure to the spam server.

The spam server determines whether or not the message requested to be transmitted corresponds to a spam message based on the data reported to the spam server as shown in FIG. 2, so in order to sort out a spam message properly, it is important to secure various spam information.

Thus, the government agencies and relevant companies generally have a series of sharing policy with respect to reported spam information, for which, in case of spam reporting, spam message information and personal information of a person who report the spam are transmitted together. The collected spam information may be shared between the relevant agencies or companies to advantageously make a single integrated database. Thus, to this end, the government agencies and relevant companies may establish a sharing policy for sharing spam message information collected from each agency or company.

The sharing policy includes detailed shared matters of personal information additionally transmitted together with original text of a spam message, a spam report subject in a spam report.

When the sharing policy is established, the spam server transmits the corresponding sharing policy to the terminal (referred to as a 'spam terminal', hereinafter) (S210). The sharing policy is transmitted to the spam terminal, 1) when a spam management program is installed and the sharing policy is first transmitted to the spam terminal, ii) when the sharing policy is altered so the altered sharing policy is transmitted to the spam terminal, and iii) when a spam management program already exists in the spam terminal but the user first performs spam reporting. Also, the spam terminal may be set such that only when the sharing policy transmitted from the spam sever is different from that stored in the terminal, the spam terminal stores the transmitted sharing policy.

The spam terminal stores the sharing policy received from the spam server in a storage unit within the spam terminal (S220). Thereafter, when the received message is determined to be a spam, the spam terminals starts a report procedure (S230) and selects a type of the spam message intended to be report (S240). In selecting the type of the spam message, the spam flag in Table 1 may be used as it is.

The user may select whether to share personal information with a government agency, a different agency, or a company or whether to change a sharing subject based on the sharing policy which has been most recently stored in the spam terminal (S250). Accordingly, when the user performs spam reporting, he may recognize an agency or a company to which the spam information is transmitted and with which the spam information is shared, in advance. In this case, if there is a new sharing policy which has been altered, the altered portion may be particularly indicated.

However, according to circumstances, when the spam terminal receives the sharing policy from the spam server, the spam server may first perform an authentication procedure on the sharing policy, and in notifying about the sharing policy for the authentication by the spam server, information such as an electronic signature or H MAC may be provided.

When the user accepts the current sharing policy, the current sharing policy of the spam server is maintained as it is and the spam terminal transmits a spam report created according to the current sharing policy to the spam server (S260). In creating the spam report, the user may set a shared policy item by arranging respective items one by one, transferring only a specific value, indicating a group to which the terminal belongs in a previously transferred group list, or by combining them.

When the user does not want to share the entirety or a portion of the current sharing policy, the list of the current sharing policy may be displayed, an entirely or partially altered sharing policy may be transmitted to the spam server, and the altered sharing policy is stored in the terminal (S270). Or, the user may not alter the sharing policy through the terminal but request a sharing policy to be altered from the spam server. Then, the spam server may transmit an altered sharing policy, thereby altering the sharing policy.

The user transmits the spam report created according to the altered sharing policy to the spam server (S280). As described above, if there is no difference from the basic sharing policy setting of the spam server, the spam report may not include the sharing policy. If the spam report includes one, it may follow the initial sharing policy or may follow an optional sharing policy.

Optionally, when transmission of the spam report to the spam server 200 from the spam terminal 100 is completed, the spam terminal 100 may add a procedure for informing that the transmission of the spam report has been completed.

The spam server 200 transmits the received spam report to each agency and company according to the sharing policy (S290). For example, the spam server 200 may transmit every personal information of the user and transmit personal information according to a sharing degree previously set by the user to a private communication provider.

However, the time or method for informing the user about the sharing policy are not limited to the forgoing method, and besides the method, whenever a spam is reported, the terminal may inform the user about the sharing policy, or whenever the sharing policy is altered, corresponding information may be provided to the user.

Also, the user may not need to inquire about a sharing policy setting whenever he reports spam. That is, when a first spam is reported in the terminal, or when the sharing policy in the spam server is altered, the terminal may inform the user accordingly, and thereafter, when the user reports spam, he may perform spam reporting according to the previously set sharing policy without inquiring about the sharing policy setting.

When the first spam is reported or when the sharing policy in the spam server has been altered so the user is informed accordingly, the user may alter the sharing policy setting with respect to the informed sharing policy. When the user alters the setting, he informs the spam server about the altered sharing policy. In this case, because the spam server knows about the altered sharing policy, when the spam terminal reports spam later, it creates only an original spam report regardless of the sharing policy and does not insert information related to the sharing policy into the spam report. Of course, in this case, if the user wants to alter the currently set sharing policy in creating the spam report, he may request alteration of the sharing policy before creating the spam report.

In the present exemplary embodiment, it is assumed that after the type of the spam message to be reported is selected and the exposure degree of the personal information of the user is selected according to the sharing policy, but the present invention is not limited thereto. That is, the sharing level according to the sharing policy may be determined any time before the spam terminal transmits the spam report to the spam server. For example, the sharing level may be determined according to the sharing policy, i) before the terminal device transmits a first spam report to the spam server, ii) when the terminal device downloads an application for transmitting the first spam report from an external source and first performs it, iii) when the basic sharing policy is stored in the terminal device in case where a spam report-related application exists in the terminal device, iv) when a company or an organization operating a spam server alters the basic sharing policy of the spam report, and v) when the user requests alteration of the currently set sharing policy of the spam report regardless of the spam report.

In order to utilize the sharing policy by the spam server 200 and the terminal 100, i) an ID value in Table 3 shown below is added to the spam report as a value for each sharing policy itself in spam reporting with respect to the sharing policy downloaded from the spam server 200, or ii) whenever the terminal downloads a desired sharing policy with respect to the sharing policy downloaded from the spam server. In this case, a detailed set value with respect to the sharing policy follows the same format as the item inserted in the spam report.

In the first case (i), the sharing policies downloaded from the spam server is even smaller than the number of actually connected terminal, so a unique value of the sharing policy determined by the spam server may be informed instead of the name of each organization and a value with respect to a sharing degree with respect to the sharing policy set by each terminal user.

In the second case (ii), the spam server automatically performs sharing of the spam report delivered from the terminal later based on the previously set sharing policy set in the terminal.

As described above, the spam server transmits spam information reported from the terminal device based on the sharing policy to a company or a government agency, and in this case, because personal information is also transmitted together with the reported spam information, having the possibility that the personal information is leaked. Thus, the user may set the extent of the agency or service provider involved that has established and share the sharing policy, the degree of personal information desired to be shared, and the like.

Namely, IDs each having a different sharing extent and exposure degree is created as shown in Table 3 below and attached in reporting spam information to the spam server.

TABLE 3

| ID | Detailed sharing policy |
|---|---|
| 0001 | Every personal information is shared with government agency and every spam server operating company |
| 0002 | Only phone number or e-mail address are shared with government agency and every spam server operating company |
| 0003 | Every personal information is shared anonymously with government agency and every spam server operating company |
| 0004 | Every personal information is shared only with government agency |
| 0005 | Only phone number or e-mail address are shared with government agency |
| 0006 | Ever personal information is shared anonymously only with government agency |

Thus, the spam server may group spam terminals selecting the same ID in the reported spam reports to manage them. The group information of the terminals having the same ID may be transmitted to the terminals or may be separately managed by the spam server for its transmission. When the sharing policy is first transmitted to the spam terminal, every ID is transmitted to the spam terminal and the user (who reports spam) may recognize it by changing a setting through the group information, or when the setting and altering by the user are completed, the user can recognize it through the spam server.

Namely, with respect to the sharing policy received from the spam server, the terminal may add whether to accept each sharing policy by items in the spam report in performing spam reporting, or the terminal may receive a desired sharing policy when performing spam reporting and inform the spam server accordingly.

The spam server shares the spam information, which has been received from the user according to the sharing policy, with a government agency or a spam server management company. As for a method for sharing spam information according to the sharing policy, the spam server may transmit only a message address value, besides a method in which the original text of the message is all transmitted to a different sharing agency. When only the message address value is transmitted, the company or government agency which has received the spam information according to the sharing policy should necessarily receive again the original text of the spam corresponding to the received spam message address value, when necessary. Thus, the spam server which wants to share spam information according to the sharing policy must transmit information regarding until when the corresponding spam information is to be kept to the government agency and the companies that share the spam information, when sharing it.

In reporting a spam through the sharing policy, when sharing degree of spam information is determined, a spam reporting procedure is performed. When a message intended to be reported as a spam message is transmitted to the spam server, the original text of the message may be transmitted. Alternatively, if the original text of the message is an e-mail or an MMS and if the capacity of an attachment file is large, an address value of the message or only a hash value included in the message may be included and transmitted. The hash value may include, for example, a fingerprint vale, a message digest value, and the like. If the message does not have a hash value, a converter within the spam terminal performs a hash function to obtain a hash value, and transmit a spam report having an address value with the message added thereto.

Figure 6:
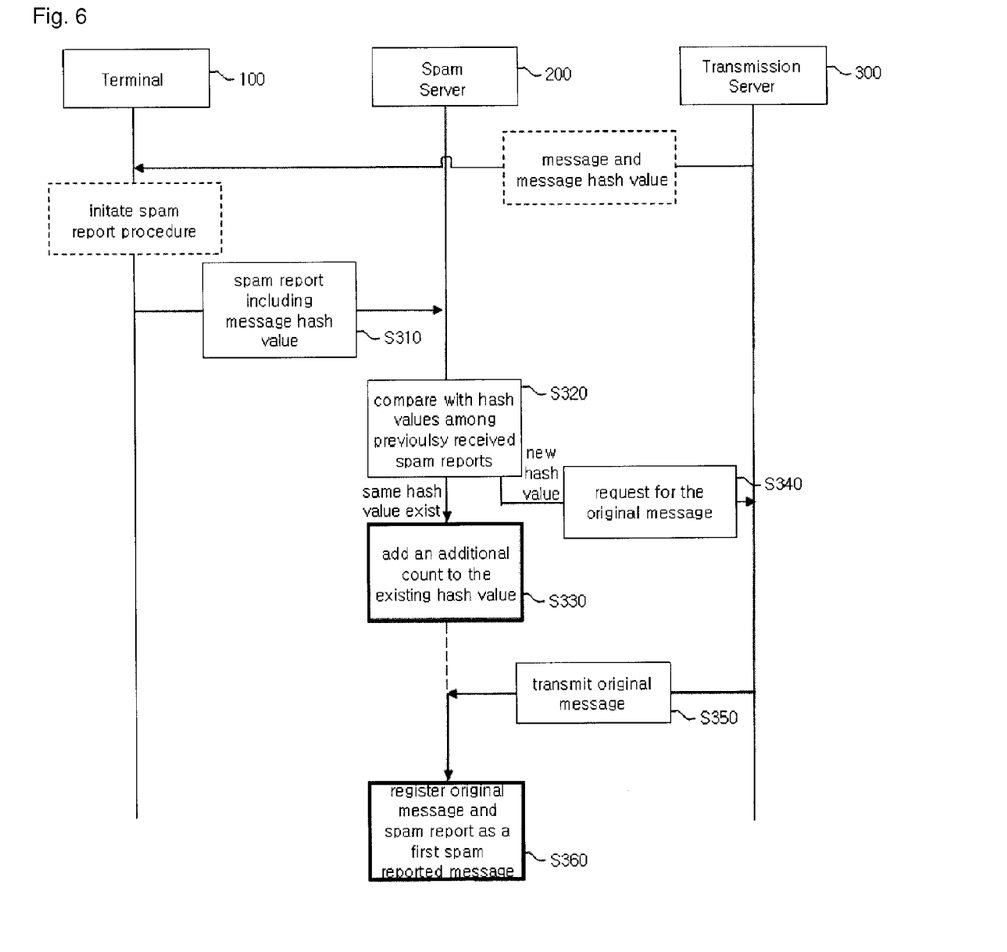
FIG. 6 is a flow chart illustrating a spam reporting procedure using a hash value when a spam message includes the hash value according to an exemplary embodiment of the present invention.

FIG. 6 is a flow chart illustrating a spam reporting procedure using a hash value when a spam message includes the hash value according to an exemplary embodiment of the present invention.

In FIG. 6, a thick solid line indicates termination of a procedure.

With reference to FIG. 6, in performing spam reporting, if the original text of a message intended to be reported includes a hash value, a spam report including the hash value may be crated and transmitted to the spam server 200 (S310).

A report flag as shown in Table 4 may be attached to the spam report, and the spam report includes the hash value and the address within the server of the message. When creation of the spam report is completed, the spam report may be shown to the user before being transmitted in order to obtain confirmation of the user regarding its transmission to the spam server 200.

TABLE 4

| Report flag | Content |
|---|---|
| A | Message spam reporting |
| B | Received content contains a spam phrase or content |
| C | Received content does not include content which is to be shunned by the minor |
| D | Reporting a request for blocking message sender |
| E | Reporting a request for blocking domain of message sender |
| F | Message corresponds to virus |
| G | File attached to message corresponds to virus |
| H | Other reasons (which can be personally added) |

Upon receiving the spam report, the spam server 200 checks whether or not the hash values of previously received spam reports include a hash value identical to the hash value of the received spam report (S320).

When there is an identical hash value, the spam server 200 increases a count regarding the number of spam reporting one time (S330), and take a suitable measure according to the policy in the spam report according to the form (e.g., spam, virus, fishing, sender blocking, no-spam, release of sender blocking, others, etc.) of each spam report.

When the reported number of the corresponding message labeled as a spam-suspected message exceeds a threshold value according to the result of the increase in the count by one time, the spam-suspected message may be changed to be classified as a spam-confirmed message.

If there is no identical hash value, the spam server request transmission of the original text of the spam message which has been reported through the spam report from the transmission server 300 (S340).

In response to the transmission request from the spam server 200, the transmission server 300 transmits the original text of the spam message, which has been reported through the spam report, to the spam server 200 (S350).

The spam server 200 stores the received original text of the spam message and the spam report of the sender in the spam server (S360).

Figure 7:
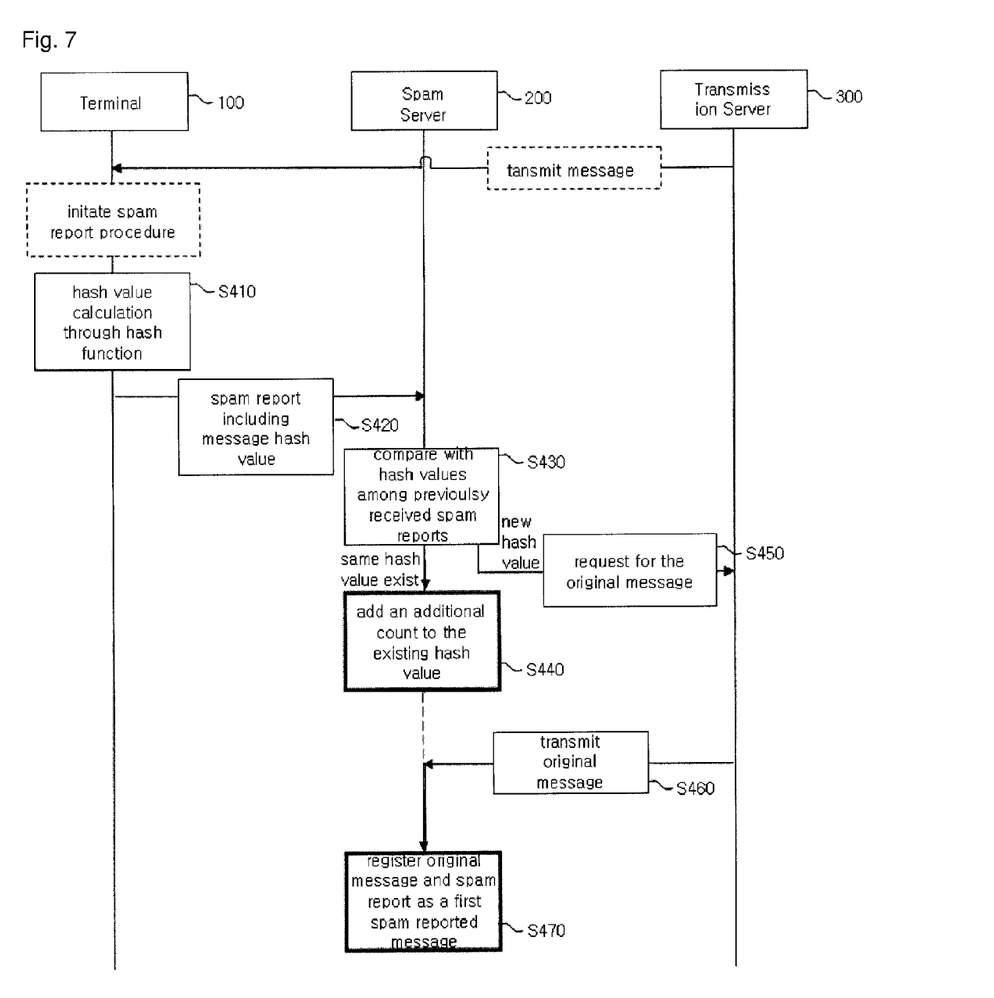
FIG. 7 is a flow chart illustrating the process of calculating, by the spam terminal, a hash value of a message, which does not virtually include a hash value, through a hash function and reporting the message as a spam message.

FIG. 7 is a flow chart illustrating the process of calculating, by the spam terminal, a hash value of a message, which does not virtually include a hash value, through a hash function and reporting the message as a spam message.

In FIG. 7, a thick solid line indicates termination of a procedure.

With reference to FIG. 7, when a message received from the transmission server 300 is determined to correspond to a spam message and the message does not include a hash value, the spam terminal 100 performs a hash function to obtain a hash value of the message intended to be reported (S410), includes the obtained hash value in a spam report, and transmits the spam report to the spam server 200 (S420).

A report flag as shown in Table 4 may be attached to the spam report, and the spam report includes the hash value and the address within the server of the message. When creation of the spam report is completed, the spam report may be shown to the user before being transmitted in order to obtain confirmation of the user regarding its transmission to the spam server 200.

Upon receiving the spam report, the spam server 200 checks whether or not the hash values of previously received spam reports include a hash value identical to the hash value of the received spam report (S430).

When there is an identical hash value, the spam server 200 increases a count regarding the number of spam reporting one time (S440), and take a suitable measure according to the policy in the spam report according to the form (e.g., spam, virus, fishing, sender blocking, no-spam, release of sender blocking, others, etc.) of each spam report.

When the reported number of the corresponding message labeled as a spam-suspected message exceeds a threshold value according to the result of the increase in the count by one time, the spam-suspected message may be changed to be classified as a spam-confirmed message.

If there is no identical hash value, the spam server request transmission of the original text of the spam message which has been reported through the spam report from the transmission server 300 (S450).

In response to the transmission request from the spam server 200, the transmission server 300 transmits the original text of the spam message, which has been reported through the spam report, to the spam server 200 (S460).

The spam server 200 stores the received original text of the spam message and the spam report of the sender in the spam server (S470).

Figure 8:
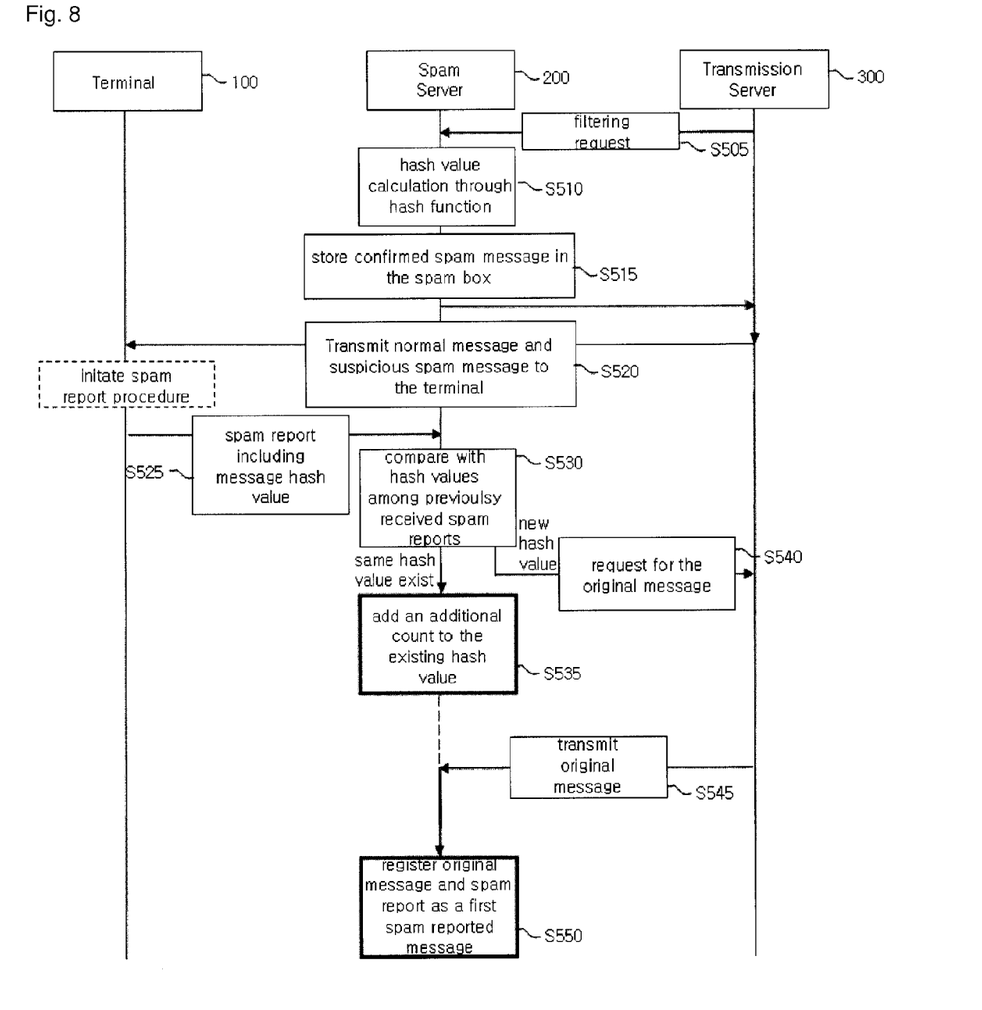
FIG. 8 is a flow chart illustrating the process of calculating, by the spam server, a hash value of a message, which does not virtually include a hash value, through the hash function and reporting the message as a spam message, before a transmission server transmits the message to the spam terminal.

FIG. 8 is a flow chart illustrating the process of calculating, by the spam server, a hash value of a message, which does not virtually include a hash value, through the hash function and reporting the message as a spam message, before a transmission server transmits the message to the spam terminal.

In FIG. 8, a thick solid line indicates termination of a procedure.

With reference to FIG. 8, in order to determine whether or not a message intended to be transmitted to the spam terminal 100 is a spam message, the transmission server 300 transmits the message to the spam server 200 to request filtering of the message (S505).

The spam server 200 performs the hash function within the spam server 200 to obtain a hash value of the message (S510).

The spam server 200 discriminates whether or not the message is a spam message through the existing spam report list based on the obtained hash value. If the message is a spam-confirmed message, the spam server 200 stores it in the spam box, without transmitting it to the terminal (S515). If the message is a normal message or a spam-suspected message, the spam server 200 transmits the original text of the message including the hash value to the spam terminal 100 (S520). In this case, a spam flag or a tag may be attached to the spam-suspected message so as to be transmitted to the spam terminal 100.

If the received message is determined to be a spam message, the user creates a spam report including the hash value of the message intended to be reported and transmits it to the spam server (S525).

A report flag as shown in Table 4 may be attached to the spam report. When creating of the spam report is completed, the spam report may be shown to the user before being transmitted in order to obtain confirmation of the user regarding its transmission to the spam server 200.

Upon receiving the spam report, the spam server 200 checks whether or not the hash values of previously received spam reports include a hash value identical to the hash value of the received spam report (S530).

When there is an identical hash value, the spam server 200 increases a count regarding the number of spam reporting one time (S535), and take a suitable measure according to the policy in the spam report according to the form (e.g., spam, virus, fishing, sender blocking, no-spam, release of sender blocking, others, etc.) of each spam report.

When the reported number of the corresponding message labeled as a spam-suspected message exceeds a threshold value according to the result of the increase in the count by one time, the spam-suspected message may be changed to be classified as a spam-confirmed message.

If there is no identical hash value, the spam server request transmission of the original text of the spam message which has been reported through the spam report from the transmission server 300 (S540).

In response to the transmission request from the spam server 200, the transmission server 300 transmits the original text of the spam message, which has been reported through the spam report, to the spam server 200 (S545).

The spam server 200 stores the received original text of the spam message and the spam report of the sender in the spam server (S550).

Figure 9:
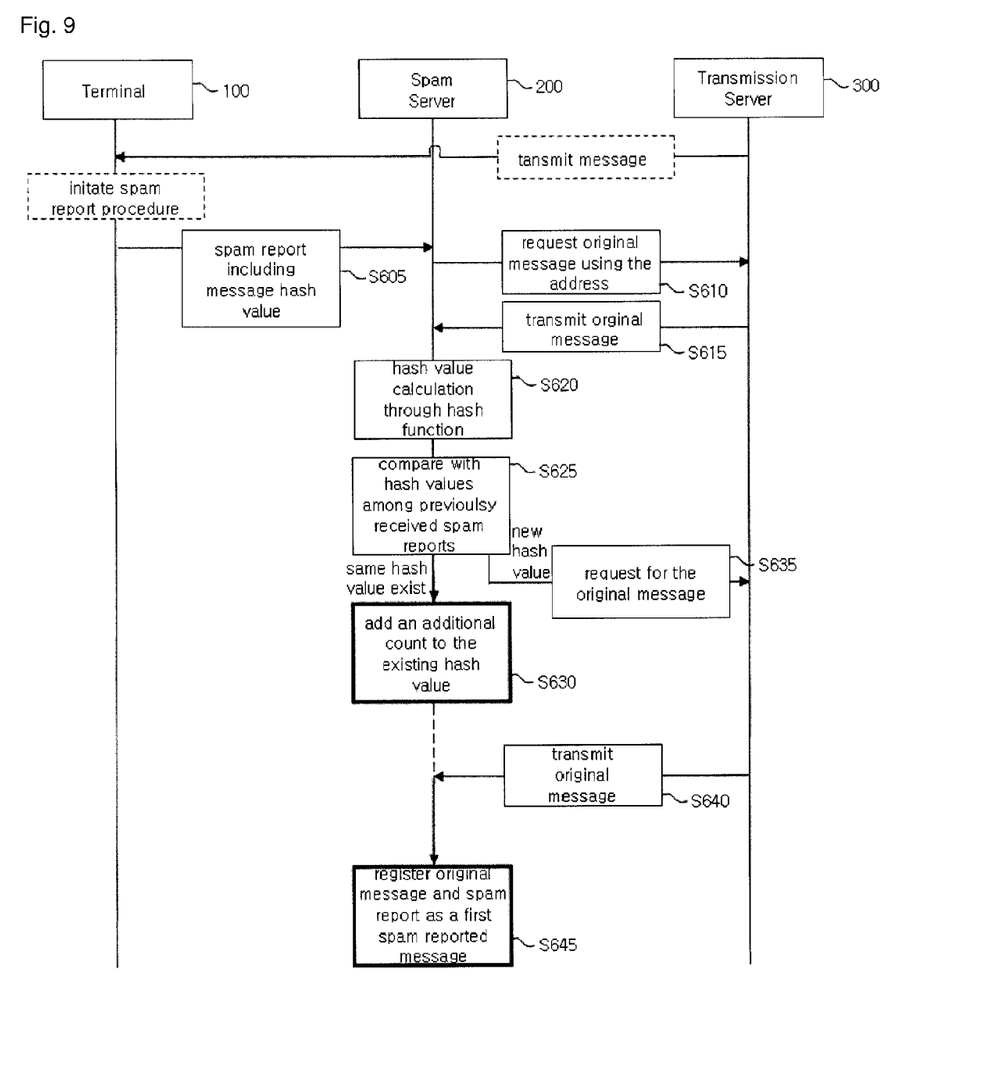
FIG. 9 is a flow chart illustrating the process of acquiring, by the spam server, original text of a message, which does not virtually include a hash value, by using an address value of the message included in a spam report, calculating a hash value through the hash function, and reporting the message as a spam message.

FIG. 9 is a flow chart illustrating the process of acquiring, by the spam server, original text of a message, which does not virtually include a hash value, by using an address value of the message included in a spam report, calculating a hash value through the hash function, and reporting the message as a spam message.

In FIG. 9, a thick solid line indicates termination of a procedure.

With reference to FIG. 9, if a spam message received form the transmission server 300 does not include a hash value and the spam terminal 100 does not have a hash function, a spam report including an address value of the spam message may be created and transmitted to the spam server 200.

In case of an SMS, because its message text is not large, the original text of the message may be included and transmitted. In case of an e-mail or an MMS, a message ID in the original text indicates an address value and an address value such as a URL or the like may be additionally included. A report flag as shown in Table 4 may be attached to the spam report. When creating of the spam report is completed, the spam report may be shown to the user before being transmitted in order to obtain confirmation of the user regarding its transmission to the spam server 200.

Upon receiving the spam report, the spam server 200 requests the original text of the message from the transmission server 300 by using the address value of the message within the spam report (S610).

When the original text of the message is received from the transmission server (S615), the spam server 200 performs a hash function through the original text of the message to obtain a hash value of the reported message (S620).

The spam server 200 checks whether or not the hash values of previously received spam reports include a hash value identical to the hash value of the received spam report (S625).

When there is an identical hash value, the spam server 200 increases a count regarding the number of spam reporting one time (S630), and take a suitable measure according to the policy in the spam report according to the form (e.g., spam, virus, fishing, sender blocking, no-spam, release of sender blocking, others, etc.) of each spam report.

When the reported number of the corresponding message labeled as a spam-suspected message exceeds a threshold value according to the result of the increase in the count by one time, the spam-suspected message may be changed to be classified as a spam-confirmed message.

If there is no identical hash value, the spam server request transmission of the original text of the spam message which has been reported through the spam report from the transmission server 300 (S635).

In response to the transmission request from the spam server 200, the transmission server 300 transmits the original text of the spam message, which has been reported through the spam report, to the spam server 200 (S640).

The spam server 200 stores the received original text of the spam message and the spam report of the sender in the spam server (S645).

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

The invention claimed is:

1. A method for managing spam information by a terminal, the method comprising:
whenever a sharing policy of the spam information is received from a spam server, storing the sharing policy in the terminal;
informing a user about the latest sharing policy among the stored sharing policies, and inquiring of the user about whether to select alteration of a sharing extent indicating with whom personal information of the user reporting at least one spam message to the spam server is shared or an exposure degree indicating which portion of the personal information is shared;
transmitting an altered sharing policy which is altered according to a user selection to the spam server and storing the altered sharing policy in the terminal, wherein the altered sharing policy includes an altered sharing extent or exposure degree for the personal information of the user; and
transmitting the personal information of the user with an indicator specifying the altered sharing extent or exposure degree to the spam server after a corresponding spam report or subsequent spam report,
wherein the transmitted personal information is transferred by the spam server to other entities including spam servers according to the altered sharing extent or exposure degree, and
the indicator is used by the spam server to classify terminals which transmit an identical indicator in a group for managing the terminals.

2. The method of claim 1, further comprising:
before the sharing policy is stored in the terminal, checking whether or not the spam server can be acceptable by the terminal through an electronic signature or H MAC information.

3. The method of claim 1, wherein the indicator is defined according to a Table as follows:

| indicator: | description: |
| --- | --- |
| 0001 | all of the personal information is shared with a government agency and all companies operating spam servers, |
| 0002 | only a phone number or an e-mail address is shared with a government agency and all companies operating spam servers, |
| 0003 | all of the personal information is shared anonymously with a government agency and all companies operating spam servers, |
| 0004 | all of the personal information is shared only with a government agency, |
| 0005 | only a phone number or an e-mail address is shared with a government agency, or |
| 0006 | all of the personal information is shared anonymously only with a government agency. |

4. A terminal for reporting spam information, the terminal comprising:
a receiver configured to receive a sharing policy of the spam information from a spam server;
a storage medium configured to store the received sharing policy and store an altered sharing policy according to a user selection;
a processor configured to inform a user about the latest sharing policy among the stored sharing policies, inquire of the user about whether to select alternation of a sharing extend indicating with whom personal information of the user reporting at least one spam message to the spam server is shared or an exposure degree indicating which portion of the personal information is shared for personal information of the user reporting at least one spam message to the spam server, and alter the sharing policy according to the user selection; and
a transmitter configured to transmit an altered sharing policy to the spam server, wherein the altered sharing policy includes an altered sharing extent or exposure degree for the personal information of the user, and transmit the personal information of the user with an indicator specifying the altered sharing extent or exposure degree to the spam server after a corresponding spam report or subsequent spam report,
wherein the transmitted personal information is transferred by the spam server to other entities including spam servers according to the altered sharing extent or exposure degree, and
the indicator is used by the spam server to classify terminals which transmit an identical indicator in a group for managing the terminals, and wherein the sharing policy is for sharing information on spam messages between spam servers including the spam server, the spam messages are collected from each of the spam servers.

5. The terminal of claim 4, further comprising:
a converter configured to perform a hash function for extracting a hash value from original text of the message.

6. The terminal of claim 4, wherein the indicator is defined according to a Table as follows:

| indicator: | description: |
| --- | --- |
| 0001 | all of the personal information is shared with a government agency and all companies operating spam servers, |
| 0002 | only a phone number or an e-mail address is shared with a government agency and all companies operating spam servers, |
| 0003 | all of the personal information is shared anonymously with a government agency and all companies operating spam servers, or |
| 0004 | all of the personal information is shared only with a government agency. |

* * * * *